United States Patent [19]
Baehr et al.

[11] 3,854,667
[45] Dec. 17, 1974

[54] APPARATUS FOR PULPING AND GRADING OF WASTE PAPER

[75] Inventors: Theodor Baehr; Helmut Thumm, both of Heidenheim Brenz, Germany

[73] Assignee: J. M. Voith GmbH, Heidenheim, Germany

[22] Filed: July 16, 1973

[21] Appl. No.: 379,578

[30] Foreign Application Priority Data
July 31, 1972 Germany............................ 2237521

[52] U.S. Cl................. 241/46.11, 241/69, 241/79.1
[51] Int. Cl............................................... B03b 1/00
[58] Field of Search......... 241/46 R, 46.11, 69, 79.1

[56] References Cited
UNITED STATES PATENTS
3,305,180  2/1967  Tomlinson .................... 241/46.11 X
3,549,092  12/1970  Baxter............................... 241/69 X FOREIGN PATENTS OR APPLICATIONS
713,501  8/1954  Great Britain ........................ 241/46

Primary Examiner—Gerald A. Dost
Assistant Examiner—E. F. Desmond
Attorney, Agent, or Firm—Michael S. Striker

[57] ABSTRACT

A receptacle can accommodate a suspension of waste paper and contaminants having low specific gravity. A rotor is provided on the peripheral wall of the receptacle so as to shred the waste paper in the suspension in order to obtain a pulp. In the region of the rotor the wall is provided with an outlet for the pulp, and in a portion of the wall opposite the rotor there is provided an additional outlet for discharging of matter having low specific gravity. A sleeve is provided on the rotor substantially concentric with the axis of rotation thereof, for directing and centering a vortex core of suspension which is being agitated by the rotor.

7 Claims, 2 Drawing Figures

PATENTED DEC 17 1974　　　　　　　　　　　　3,854,667

APPARATUS FOR PULPING AND GRADING OF WASTE PAPER

BACKGROUND OF THE INVENTION

The present invention relates in general to the preparation of waste paper stock, and more particularly to an apparatus suitable for pulping and grading of waste paper in order to thereby produce a waste paper stock therefrom.

It is not necessary to discuss in detail the recovery of pulp or stock from waste paper because this is well known in the art. The waste paper must be shredded for this purpose in a suspension, in order to form from it a pulp which can be further processed. However, as those conversant with the art know, a difficulty in the preparation of stock from waste paper in recent years resides in the fact that quite often substances of low specific gravity, such as synthetic plastic foams, rubber, pieces of sheet foils and the like are admixed with the waste paper and then enter the apparatus. These substances cannot become a part of the paper pulp and cannot be discharged with the latter. They must be separated from the pulp and separately removed.

Experience has shown that this light-weight matter, hereafter also referred to as "impurities" causes problems resulting from the fact that this matter accumulates very rapidly in the receptacle of the apparatus wherein the pulping is carried out, so that after a relatively brief operating peroid the apparatus must be shut down in order to permit complete emptying of the receptacle of the accumulated impurities. This is so because in most of the prior-art apparatus there is no way in which the impurities can be removed in any other way. Of course, a complete shutdown of the apparatus means lost time and increased expenses, and this is not tolerable for the viewpoint of operating economy.

One proposal of the prior art has been to withdraw from the receptacle a partial stream of the pulped suspension, supply it to an additional pulper or disintegrator and to a subsequent coarse grading device, and then return it into the original receptacle. Such an approach will quite evidently increase the expenses involved and decrease the economy of operation of the apparatus, due to the investment costs involved in acquiring the additional equipment and the increased energy requirements for operating such equipment.

Another prior-art proposal has suggested a receptacle for accommodating a waste paper suspension, and a rotor which is located adjacent one portion of the receptacle wall. This wall is also provided in the region of the rotor with an outlet for pulp produced by shredding of the waste paper by the rotor, so that this pulp can be discharged from the receptacle through the outlet. A strainer is interposed in this outlet, and a second outlet is provided in an opposite portion of the receptacle wall, being arranged to discharge matter having low specific gravity. This proposal of the prior art is based on the realization that the vortex flow caused by the rotating rotor forms a core which extends from the rotor to the opposite wall of the receptacle wherein the outlet for the impurities is provided, with the result that these impurities of low specific gravity tend to accumulate in the region of this wall having that outlet, so that they can be withdrawn through that outlet.

This prior-art proposal just mentioned represents by far the most effective solution to date. However, it does not provide for a very precise separation of the low specific gravity impurities from the other components in the suspension, and from this point of view a further improvement is still desirable.

SUMMARY OF THE INVENTION

It is, accordingly, a general object of the present invention to provide this further improvement.

More particularly it is an object of the invention to provide an improved apparatus for pulping and grading of waste paper wherein a more precise separation of the low specific gravity impurities from the remaining components of the suspension is obtained.

In keeping with these objects, and with others which will become apparent hereafter, one feature of the invention resides, in an apparatus for pulping and grading of waste paper which may be admixed with matter having low specific gravity, in a combination which comprises a receptacle adapted to accommodate a waste paper suspension and having a peripheral wall. Rotor means having an axis of rotation is located in the receptacle adjacent one portion of the wall for shredding the waste paper in the suspension so as to obtain a pulp. First outlet means is provided in the wall in the region of the rotor means for discharge of the pulp. Second outlet means is provided in another portion of the wall opposite to the one portion and extending transversely of the axis for discharging of matter of low specific gravity. A sleeve is provided on the rotor means substantially concentric with the axis of rotation thereof, and serves for directing and centering a vortex core of suspension which is being agitated by the rotor means.

The purpose of this sleeve is to assure that the position of the vortex core formed by the suspension which is agitated by the rotor, is precisely predetermined, and the core should be desirably located at the center of the receptacle. This prevents the low specific gravity impurities which have already been drawn into this core, from being engaged again by the rotor and being ejected back into the circulating suspension. It thus affords a stabilization of the vortex core, an effect which is further improved if on the wall provided with the outlet for the impurities an additional sleeve is provided, surrounding the outlet and extending into the interior of the receptacle.

It is also advantageous if the rotor is constructed as a substantially flat disc-shaped component having agitating blades or wings which extend in a substantially star-shaped configuration. Such a construction is simple and inexpensive to produce. The effectiveness of the rotor is further improved if the edges of the blades which are the leading edges as seen with respect to the direction of rotation of the rotor, are each provided with a raised rib.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
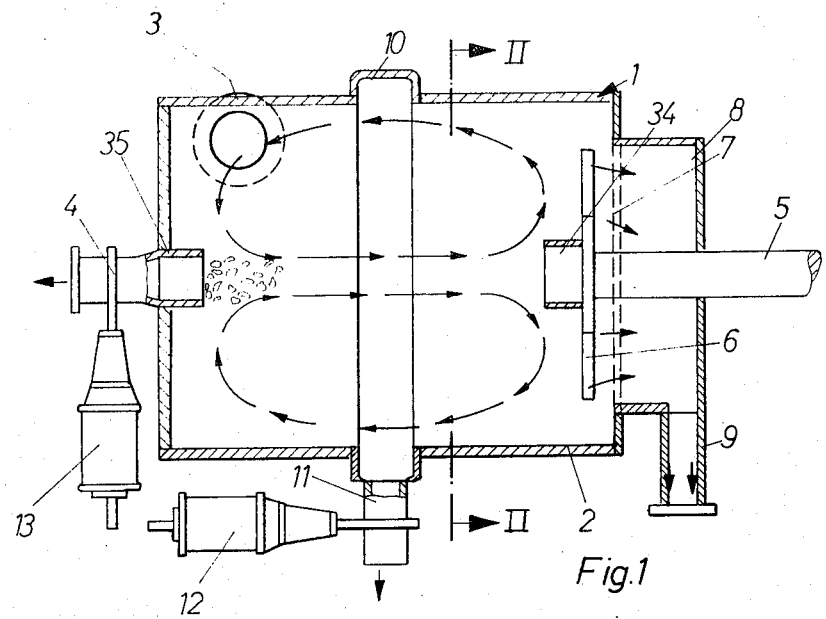
FIG. 1 is a somewhat diagrammatic axial section through an apparatus according to the present invention.
Figure 2:
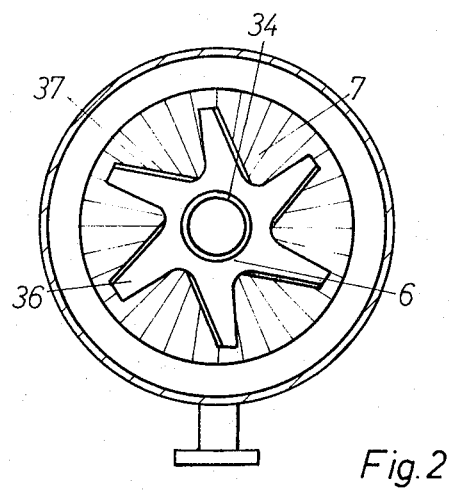
FIG. 2 is a somewhat diagrammatic cross section taken on line II—II of FIG. 1.

The apparatus illustrated in FIGS. 1 and 2 is designated in toto with reference numeral 1. It has a closed substantially cylindrical housing 2 whose circumference is provided with a substantially tangentially extending inlet conduit 3 for the suspension of liquid and waste paper. As outlined earlier, this waste paper usually includes light-weight contaminants such as synthetic plastic foils and the like which must be withdrawn from the suspension because they cannot be pulped and made a part of the pulp which is to be reused.

One end of the housing 2 is provided with an outlet conduit 4 for discharge of these light-weight impurities. The opposite end of the housing has a shaft 5 extending from the exterior into the interior of the receptacle of the housing, and the inner end of the shaft carries a rotor 6 which, when it is rotated by transmitting rotary motion to the shaft 5 (i.e., via a non-illustrated drive well known per se), shreds the waste paper which floats in the suspension, causing the waste paper to become pulped. An outlet across which a screen or sieve 7 extends, is located behind the rotor 6 and through this outlet the pulp produced by the rotor is discharged for further use. The longitudinal axis of the outlet opening communicating with the discharge conduit 4 is so located that the axis of rotation of the shaft 5 and the rotor 6 passes through it.

Rearwardly of the screen 7 the housing 2 is provided with a collecting chamber 8 for the pulp, from the lower end of which chamber 8 a conduit 9 extends for discharge of the pulp.

Contaminants having high specific gravity, which are also frequently encountered in the waste paper which is used to make up the suspension, are discharged via an annular channel 10 provided in the circumferential wall of the housing 2 and communicating with an outlet 11. The outlet 11 can be opened and closed by a slide valve 12, and the outlet conduit 4 can be opened and closed by a slide valve 13. In operation of the apparatus, the valves 12 and 13 are only operated from time to time to open the respective outlets for a brief period, so as to permit discharge of the accumulated impurities (of high weight or low weight) and to prevent excessive loss of usable suspension material.

As seen more clearly in FIG. 2, the rotor 6 is a substantially flat disc-shaped component having wings or blades 36 which extend in substantially star-shaped manner. The leading edge of each of these wings or blades 36, that is the edge which is the leading one as seen with reference to the direction of rotation of the rotor, is provided with a raised rib 37 which can be produced in a simple manner by welding or otherwise connecting to the respective blade 36 a hard-metal strip.

In accordance with the present invention the rotor 6 is further provided with a coaxial sleeve 34 on its side facing the interior of the receptacle, that is facing in the direction towards the inlet opening to the discharge conduit 4. The sleeve 34 is coaxial or substantially coaxial with the axis of rotation of the shaft 5 and the rotor 6. A second sleeve 35 (which could be omitted in some circumstances) is provided on the end wall of the housing in which the inlet to the conduit 4 is provided, and the sleeve 35 also extends into the interior of the receptacle towards the rotor 6, as shown in FIG. 1.

When the rotor is rotated and the interior of the housing 2 is filled with suspension, it will cause in the interior of the housing a suspension flow pattern as indicated by the arrows in FIG. 1. The suspension which enters through the tangentially communicating inlet conduit 3 is caused—in the region of the left-hand end wall of the housing 2 (see FIG. 1) to enter a flow in longitudinal direction of the housing, that is lengthwise of the axis of rotation of the rotor 6, and in direction towards the latter. The waste paper in the suspension comes in contact with the blades of the rotor 6, becoming pulped thereby and being discharged through the screen 7 (see the arrows in FIG. 1) to enter into the chamber 8 from which it is discharged through the conduit 9.

Those portions of the suspension which have not yet been sufficiently pulped by the rotor 6 circulate back along the inner circumferential wall of the housing 2 in the direction towards the opposite end (the left-hand end in FIG. 1), as indicated by the arrows, and then are being drawn again along the axis of rotation of the rotor 6 towards the latter.

The high-weight impurities, that is contaminants having high specific gravity, settle into the channel 10 from where they are intermittently discharged via the conduit 11 by operation of the slide valve 12.

The light-weight impurities, that is those contaminants which have low specific gravity, are drawn into the vortex core formed in the suspension due to the rotation of the rotor 6, and will accumulate in the region of the left-hand end wall of the housing 2, that is in the region of the inlet to the conduit 4. The vortex core is precisely located at the center of the housing 2 in that it extends from the sleeve 34 to the sleeve 35 which serve to center and maintain it in position. Because of the centering and maintenance of the core the accumulated light-weight particles (see FIG. 1 where they are diagrammatically represented) cannot break out of the vortex core and participate again in the flow pattern indicated by the arrows in FIG. 1, but instead retain their position as shown in FIG. 1, so that they can be readily withdrawn through the conduit 4 when the slide valve 13 is operated to open the latter intermittently. This provides for the desired improvement, namely for the more precise separation of light-weight impurities from the remainder of the suspension.

It will be understood that each of the elements described above, or two or more together, may also find a useful application in other types of constructions differing from the types described above.

While the invention has been illustrated and decribed as embodied in an apparatus for pulping and grading of waste paper, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. In an apparatus for pulping and grading of waste paper which may be admixed with matter having low specific gravity, a combination comprising a receptacle adapted to accommodate a waste paper suspension and having a peripheral wall; rotor means having an axis of rotation and located in said receptacle adjacent one portion of said wall for shredding the waste paper in said suspension so as to obtain a pulp; first outlet means in said wall in the region of said rotor means for discharge of the pulp; second outlet means in another portion of said wall opposite to said one portion and extending transversely of said axis and substantially concentric thereto for discharging of matter having low specific gravity; and a tubular sleeve provied on said rotor means substantially concentric with said axis and said second outlet means and operative for directing and centering a vortex core of suspension which is being agitated by said rotor means.

2. A combination as defined in claim 1; and further comprising screen means in said first outlet means for screening said matter of low specific gravity from the pulp being discharged.

3. A combination as defined in claim 1, wherein said rotor is of substantially flat disc-shaped configuration and has blades which are arranged in a substantially star-shaped configuration.

4. A combination as defined in claim 3, wherein said blades each have an edge which is the leading edge with reference to the direction of rotation of said rotor; and wherein the respective leading edge is provided with a raised rib.

5. In an apparatus for pulping and grading of waste paper which may be admixed with matter having low specific gravity, a combination comprising a receptacle adapted to accommodate a waste paper suspension and having a peripheral wall; rotor means having an axis of rotation and located in said receptacle adjacent one portion of said wall of shredding the waste paper in said suspension so as to obtain a pulp; first outlet means in said wall in the region of said rotor means for discharge of the pulp; second outlet means in another portion of said wall opposite to said one portion and extending transversely of said axis for discharging of matter having low specific gravity; a first sleeve provided on said rotor means substantially concentric with said axis; and a second sleeve on said other wall portion, surrounding said second outlet means and projecting into the interior of said receptacle and toward said first tubular sleeve, said first and second tubular sleeves being operative for directing and centering a vortex core of suspension which is being agitated by said rotor means.

6. In an apparatus for pulping and grading of waste paper, a combination comprising a receptacle for receiving a waste paper suspension, said receptacle having wall means including a peripheral wall and two oppositely located end walls; rotor means located in said receptacle adjacent one of said end walls for shredding the waste paper in said suspension so as to obtain a pulp; first outlet means provided in said wall means in the region of said rotor means for discharge of the pulp from said receptacle; second outlet means provided in the other of said end walls for discharge from said receptacle of matter having low specific gravity and which is in the form of a suspension; and means for centering the core of a vortex generated by said rotor means and including at least one tubular sleeve provided on said rotor coaxially therewith.

7. A combination as defined in claim 6, wherein said second outlet means is coaxial with said rotar means; and wherein said means for centering the core of a vortex includes an additional sleeve on said other end wall, surrounding said second outlet means in the interior of said receptacle.

* * * * *